United States Patent
Zafiroglu

[11] Patent Number: 6,063,473
[45] Date of Patent: May 16, 2000

[54] ABRASION-RESISTANT COMPOSITE SHEET

[75] Inventor: Dimitri Peter Zafiroglu, Wilmington, Del.

[73] Assignee: XYMID L.L.C., Petersburg, Va.

[21] Appl. No.: 08/661,502

[22] Filed: Jun. 11, 1996

Related U.S. Application Data

[63] Continuation-in-part of application No. 08/330,886, Oct. 28, 1994, abandoned, which is a continuation-in-part of application No. 08/023,270, Feb. 26, 1993, abandoned.

[51] Int. Cl.[7] .................................................. B32B 3/02
[52] U.S. Cl. .............................. 428/86; 428/92; 428/95; 428/96; 428/318.4; 428/317.5; 442/315
[58] Field of Search ............................ 428/96, 86, 95, 428/92, 304.4, 318.4, 317.5; 442/315

[56] References Cited

U.S. PATENT DOCUMENTS

| | | | |
|---|---|---|---|
| 3,274,046 | 9/1966 | Shannon et al. | 428/86 |
| 3,468,748 | 9/1969 | Bassett | 161/122 |
| 3,481,821 | 12/1969 | Brunner et al. | |
| 3,575,782 | 4/1971 | Hansen | 161/141 |
| 3,650,800 | 3/1972 | Reiner | 117/37 |
| 3,669,781 | 6/1972 | Lee et al. | 156/84 |
| 3,676,906 | 7/1972 | Eggleston | 28/72 FT |
| 3,759,736 | 9/1973 | Jenny et al. | 117/335 T |
| 3,951,718 | 4/1976 | Gonzalez | 156/79 |
| 4,159,361 | 6/1979 | Schupack | 428/240 |
| 4,239,829 | 12/1980 | Cohen | 428/86 |
| 4,298,643 | 11/1981 | Miyagawa et al. | 428/85 |
| 4,392,903 | 7/1983 | Endo et al. | 156/167 |
| 4,606,964 | 8/1986 | Wideman | 428/152 |
| 4,773,238 | 9/1988 | Zafiroglu | 66/192 |
| 4,808,458 | 2/1989 | Watt et al. | 428/90 |
| 4,876,128 | 10/1989 | Zafiroglu | 428/102 |
| 4,888,228 | 12/1989 | Sidles | 428/86 |
| 5,075,142 | 12/1991 | Zafiroglu | 428/36.1 |
| 5,158,821 | 10/1992 | Gebauer et al. | 428/174 X |
| 5,271,982 | 12/1993 | Verpoest et al. | 428/86 |

FOREIGN PATENT DOCUMENTS

| | | | |
|---|---|---|---|
| 162238 | of 1988 | Japan | B32B 27/12 |
| 85614 | of 1989 | Japan | A47G 27/02 |
| 85615 | of 1989 | Japan | A47G 27/02 |
| 2 096 536 | 10/1982 | United Kingdom | B32B 5/26 |
| WO 94/00043 | 1/1994 | WIPO | A47G 27/04 |

*Primary Examiner*—Elizabeth M. Cole
*Attorney, Agent, or Firm*—Lawerence Isakoff

[57] ABSTRACT

An abrasion-resistant composite sheet having a surface layer of pile-like fibers immobilized by resin. The surface layer has a thickness of 0.5–3 mm, a pile-like fiber concentration of 0.05 to 0.5 g/cm$^3$, a resin containing depth of at least 0.5 mm and a density of at least 0.5 g/cm$^3$. The pile-like fibers can be derived from particular contracted stitchbonded, knit or woven fabrics or from conventional pile fabrics having specific characteristics.

13 Claims, 4 Drawing Sheets

6,063,473

ABRASION-RESISTANT COMPOSITE SHEET

CROSS-REFERENCE TO RELATED APPLICATION

This is a continuation-in-part of application Ser. No. 08/330,886, now abandoned filed Oct. 28, 1994, which was a continuation-in-part of application Ser. No. 08/023,270, filed Feb. 26, 1993, now abandoned.

BACKGROUND OF THE INVENTION

1. Field of the Invention

This invention relates to a composite sheet, to processes for making the composite sheet and to articles in which the composite sheet is incorporated. More particularly, the invention concerns such a composite sheet having a surface layer within which pile-like fibers are immobilized in a position that is generally vertical to the surface of the sheet. The composite sheet of the invention is highly resistant to abrasion.

2. Description of the Prior Art

It is known to combine various woven, knit or nonwoven fabrics with plastic sheets or resin layers to form composite sheets intended for use in thermoforming and molding processes. For example, Zafiroglu, U.S. Pat. No. 5,075,142, and Japanese Patent Application Publications 63-111050 and 63-162238 disclose such composite sheets. Miyagawa et al, U.S. Pat. No. 4,298,643, discloses a particular fabric having an exposed pile layer, the back of the fabric being bonded or laminated to a thermoplastic sheet. Although moldable composites have been utilized widely in many applications, such composites are in need of improvement when intended for use in articles that are subject to severe abrasion, such as athletic shoe parts, luggage corners and surface layers, protective work clothes, heavy-duty sacks and the like.

Pile fabrics, such as velvets, velours, terry cloths, moquettes, tufted fabrics, and the like, each have a surface layer in which fibers are generally vertical to the surface of the fabric. Certain stitchbonded fabrics in which a fibrous layer is contracted and buckled by means of elastic threads attached to the fibrous layer to form a layer of pile-like groups of fibers, are disclosed by Zafiroglu, U.S. Pat. Nos. 4,773,238 and 4,876,128. Generally, such pile or pile-like fabrics are not incorporated in composite sheets. However, Japanese Laid-open Patent Applications 64-85614 and 64-85615 disclose a floor mat which includes a tufted-monofilament pile, having an 8-mm height and a 0.08-g/cm$^3$ pile fiber concentration, onto which a rubber resin is sprayed. The combination of the pile fiber and resin comprises 38 weight % resin and has an average density of 0.13 g/cm$^3$. Increases in the abrasion resistance of such floor mats could significantly improve their utility.

An aim of the present invention is to provide a composite sheet that has high resistance to abrasion.

SUMMARY OF THE INVENTION

The present invention provides an abrasion-resistant composite sheet. The sheet comprises an upper outer surface, a lower surface, a planar fibrous network located between and substantially parallel to the upper and lower surfaces, a stratum comprising pile-like fibers that loop through the planar fibrous network, protrude generally perpendicularly from the planar fibrous network and extend to the upper outer surface of the composite sheet, and a resin that immobilizes the pile-like fibers in a position generally vertical to the planar fibrous network. The stratum of pile-like fibers has a height in the range of 0.5 to 3.0 millimeters and a concentration of vertical pile-like fibers in the range of 0.05 to 0.5 g/cm$^3$. The resin extends through the stratum of pile-like fibers from the upper outer surface to a depth of at least 0.5 mm. The resin-containing depth of the pile-like stratum has a density of at least 0.5 gram/cm$^3$. The composite sheet has a stretchability of no greater than 25%, a compressibility of no more than 25%, and a total unit weight in the range of 150 to 3,000 grams/m$^2$. Typically, the composite sheet comprises in the range of 30 to 90 percent resin, preferably at least 50% and most preferably at least 70%, based on the total weight of the resin-containing pile-like stratum. Also, it is preferred that the concentration of the vertical pile-like fibers is in the range of 0.1 to 0.35 g/cm$^3$, the density of the resin-containing depth of the pile-like stratum is in the range of 0.7 to 1.0 g/cm$^3$, the height of the stratum of pile-like fibers is in the range of 1 to 3 mm and that the resin extends throughout the entire pile-like stratum. Typically, the composite sheet exhibits a 40-grit Wyzenbeek abrasion wear of no more than 50 microns per 1,000 cycles.

The invention also provides a process for making the abrasion-resistant composite sheet, comprising the steps of (a) forming a fabric having an upper surface, a lower surface, a planar network of yarns located between and substantially parallel to the upper and lower surfaces, and a stratum of pile-like fibers that loop through the planar fibrous network, protrude generally perpendicularly from the planar fibrous network and extend to the upper surface of the fabric, the stratum of pile-like fibers having a height in the range of 0.5 to 3.0 millimeters and a concentration of vertical pile-like fibers in the range of 0.05 to 0.5 g/cm$^3$, (b) immobilizing the generally vertical fibers in their vertical position by incorporating a resin in the stratum of pile-like fibers to a depth of at least 0.5 mm from the upper surface of the fabric in an amount sufficient to provide the resin-containing depth of the pile-like stratum with a density of at least 0.5 gram/cm$^3$, and (c) stabilizing the dimensions of the composite. In a preferred embodiment of the process, the fabric-forming step includes increasing the concentration of the vertical fibers in the stratum of pile-like fibers by contracting the area of the fabric by a factor of at least two, preferably by a factor in the range of 3 to 10 and the concentration of vertical pile-like fibers is raised to a concentration in the range of 0.15 to 0.5.g/cm$^3$.

The invention further provides a shaped article that has the abrasion-resistant composite sheet attached to at least a portion of the surface of the article.

BRIEF DESCRIPTION OF THE DRAWINGS

The invention will be better understood by referring to the attached drawings in which like numerals designate like features and.

DETAILED DESCRIPTION OF PREFERRED EMBODIMENTS

Figure 1:
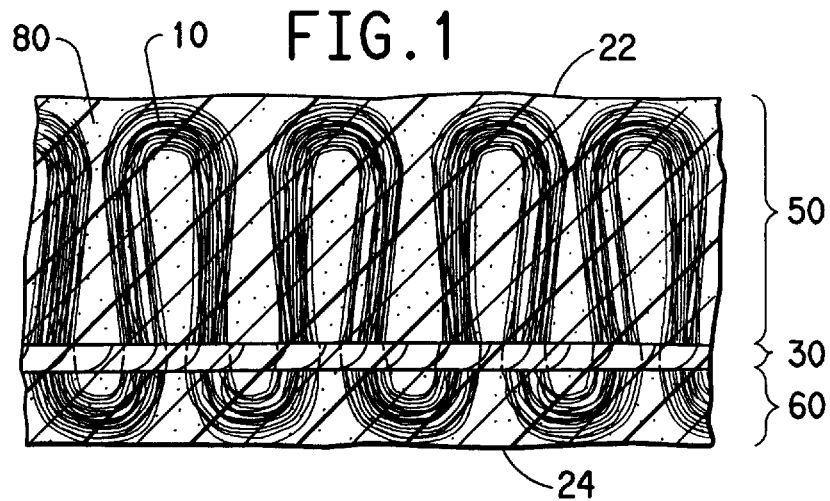
FIGS. 1, 2 and 3, each is an idealized cross-section of a composite sheet of the invention with FIG. 1 depicting a loop-pile fabric impregnated with resin throughout its thickness, FIG. 2 depicting a cut-pile fabric impregnated with resin throughout its thickness and FIG. 3 depicting a cut-pile fabric impregnated with resin only partially through its pile thickness.
Figure 2:
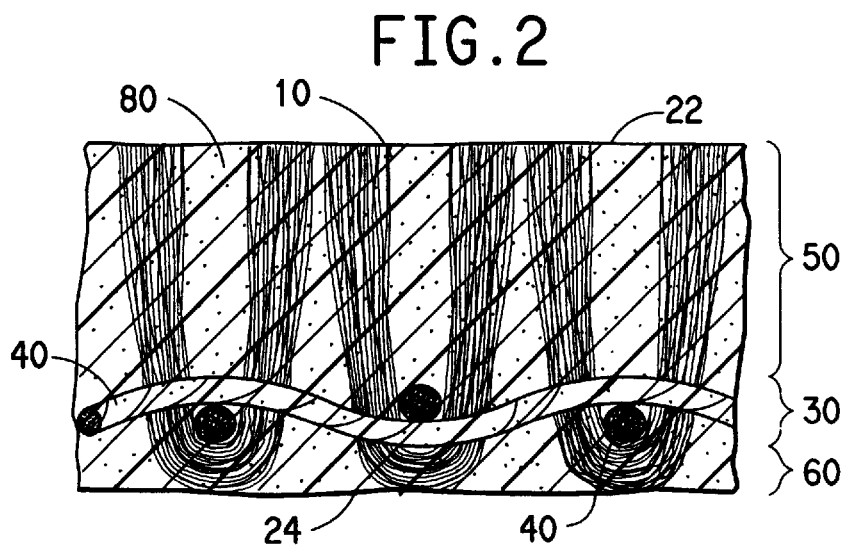
Figure 3:
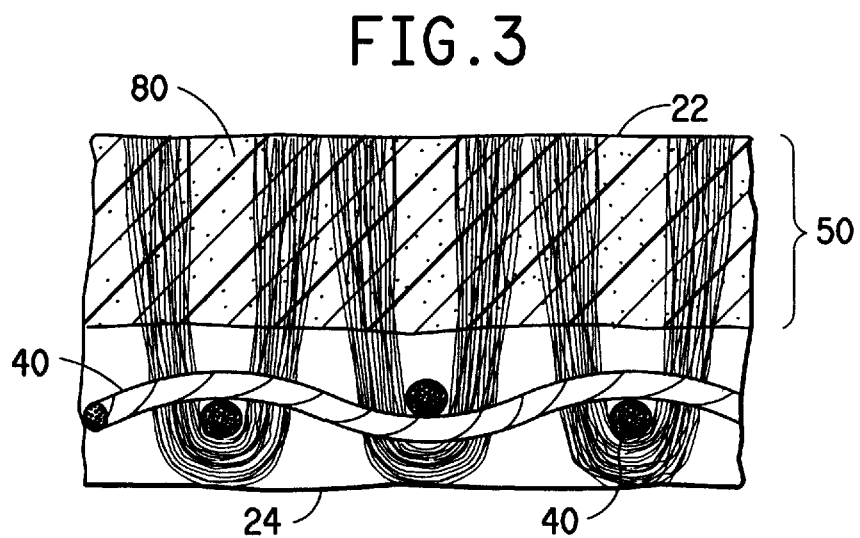

The following description of preferred embodiments are included for the purposes of illustration and are not intended to limit the scope of the invention, which scope is defined by the appended claims.

Several terms used herein are defined as follows. "Pile-like groups of fibers" or "pile-like fibers" include tufted yarns, loop-pile yarns, cut-pile yarns, buckled yarns, inverted U-shaped loops formed from buckled nonwoven layers of textile fibers, as well as the pile fibers of velvets, velours, terry cloths and the like. Spandex is a generic term for a manufactured fiber in which the fiber-forming substance is a long chain elastomer comprised of at least 85% segmented polyurethane. The term "combination yarn" means a yarn in which there are two dissimilar component yarns. In the present invention, the component yarns comprise at least a shrinkable or elastomeric yarn and a conventional non-elastic yarns (sometimes referred to as "hard" yarns) of natural or synthetic textile fibers.

As shown in FIGS. 1–6, the abrasion-resistant composite sheet of the invention as an upper outer surface 22, a lower surface 24, a planar fibrous network 30 of yarns 40 located between upper and lower surfaces 22 and 24, a stratum 50 in which pile-like groups of fibers 10 are crowded together and are immobilized within the stratum by resin 80. The pile-like fibers 10 loop through and protrude at a large angle (e.g., 60 to 90 degrees) from the planar fibrous network 30 and extend to upper outer surface 22. The fibers within the pile-like groups of fibers, as well as the fibers within the buckled nonwoven fibrous layers, are preferably of conventional textile titre, that is, in the range of about 0.7 to 20 decitex. However, pile-like groups of fibers from plexifilamentary strands also can provide satisfactory pile-like fibers. Typically, a small portion of the pile-like fibers or pile yarns that loop through the planar fibrous network forms a much thinner layer 60 of yarns on the lower side of the planar fibrous network.

The planar network 30 is located no further than 3 mm from the upper outer surface 22. Typically, planar network 30 is formed from knitting yarns, weaving yarns, stitching threads or the like. However, a nonwoven network of fibers through which yarns are tufted, such as the continuous polyester filament spunbonded Reemay® fabric of Sample 18 in Example 7 below, also can provide a satisfactory planar network. Such nonwoven fabrics are intended to be included in the term planar network. In use, outer surface 22 is intended to be the surface of the composite sheet that is exposed to abrasion. The resin and the planar network of yarns prevent the generally vertical, pile-like fibers from moving from side to side or from being crushed when the surface of the composite is subjected to lateral and normal forces during repeated cycles of abrasion or rubbing.

In accordance with the invention, the pile-like fiber stratum of the abrasion-resistant composite has a thickness in the range of 0.5 to 3 mm. Thicknesses of greater than 3 mm are avoided, not only for reasons of economy but also because immobilization and stabilization of the pile-like fibers in position typically becomes inadequate when the to-be-abraded surface is further than 3 mm away from the planar fibrous network. The concentration of generally vertical fibers within the pile-like stratum is in the range of 0.05 to 0.5 gram/cm$^3$, preferably in the range of 0.15 to 0.35 g/cm$^3$. Within the composite, the resin typically constitutes 30% to 90%, preferably at least 50% and most preferably at least 70%, of the total weight of the resin-containing pile-like fiber stratum. The density of the resin-containing pile-like fiber stratum is at least 0.5 g/cm$^3$, preferably in the range of 0.7 to 1 g/cm$^3$. The higher concentrations of resin in the structure typically provide higher abrasion resistance to the composite sheets. Also, the higher amounts of resin are employed in composites of the invention that have the lower concentrations of vertical fibers in the pile-like fiber stratum. For example, in composite sheets of the invention having pile fiber concentrations of less than 0.1 g/cm$^3$, a layer constituting at least 70% resin is preferred. Also relatively harder resins are preferred with low concentrations of pile fibers. In composite sheets having a relatively high pile fiber concentration, lower percentages of softer resins can be employed satisfactorily (e.g., 30–50%).

Various types of resins are suitable for immobilizing the fibers or fiber bundles in the generally vertical position. Particularly useful polymeric resins include polyurethanes, epoxies, synthetic rubbers, polyesters, polyacrylates polyethers, polyetheresters, polyamides, copolymers and mixtures thereof and the like. The resins can be thermoplastic or thermosetting. The resins can be applied in any of several conventional ways, as for example, by dipping, spraying, calendering, applying with a doctor knife, or other such techniques. The resin may be applied from a solution, slurry or by melting a layer of the resin and forcing it into the layer of vertical fibers. The resin can be introduced as adhesive particles or as binder fibers that are activated by heat or chemicals. Conventional coagulation and/or foaming techniques also may be employed to incorporate the resin. The resin or binder can be introduced into the fibrous layer before, during or after the optional contraction step that may be employed to increase the concentration of vertical fibers in the pile-like layer. However, when forming the pile-like fiber stratum and incorporating resin therein, care must be taken to avoid deflecting the fibers from their vertical position and immobilizing the fibers in such a position. After incorporation into the pile-like fiber layer, the resin is dried and/or cured by conventional methods.

It is preferred that the resin completely impregnate the entire thickness of the composite sheet cross-section. However, complete impregnation of the thickness is not necessary. Satisfactory abrasion resistance is imparted to the composite sheets of the invention, when the resin extends into the pile-like fiber stratum from the outer surface of the composite to a depth of at least 0.5 mm. Note that for satisfactory abrasion resistance, the tips of the pile-like fibers extending to the outer surface of the composite, must be covered with the resin. Also, it is preferred that there be no excess fiber-free resin on the outer surface of the composite, because such fiber-free resin does not provide the abrasion resistance provided by the resin-impregnated pile-like fiber stratum of the invention.

The resin-containing pile-like fiber stratum of a composite sheet of the invention typically is not completely filled with resin and fiber. The layer can contain many small voids. A density of the resin-containing portion of the pile-like fiber stratum typically is at least 0.5 g/cm$^3$. The voids typically amount to at least 10% of the total volume of the pile-like fiber/resin layer. For lighter weight and more flexible composite sheets, surface layer void volumes of 25 to 75% are preferred.

The composite sheet of the invention is much more abrasion resistant than a 100% resin layer containing no vertical fibers or a resin/fiber surface layer in which the fibers are not in a vertical position. The Examples below show that composites of the invention having vertical fibers embedded in a layer of relatively soft polyurethane resin can be 50 to 150 times more resistant to abrasion than a layer made 100% from the same resin. When relatively wear-resistant resins are employed, the advantage of the fiber/resin stratum of the invention over a layer of 100% of the same resin is not as great. However, compared to surface layers containing no fibers or containing horizontal fibers, the resin-containing pie-like fiber stratum of a composite of the invention still is much more abrasion resistant.

In the process of the invention, the first step is to provide a fabric that has the a stratum of pile-like fibers that loop through a planar fibrous network and extend generally perpendicularly therefrom to the outer surface of the fabric.

Figure 4:
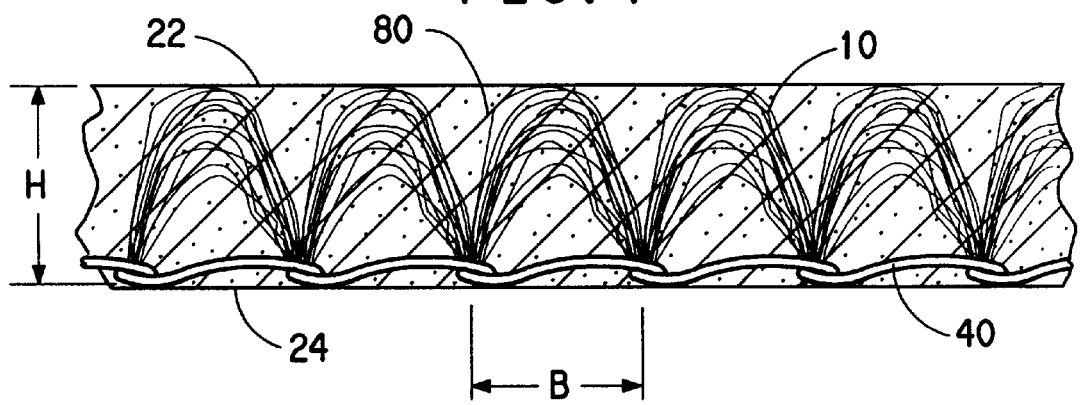
FIG. 4 represents a magnified cross-section of groups of buckled fibers formed into generally vertical inverted U-shaped loops 10 of height H and base B immobilized by resin 80 and projecting from network 30 of contracted yarns 40.

In accordance with certain embodiments of the process of the invention, the generally vertical pile-like fiber stratum is derived from a substantially nonbonded fibrous nonwoven layer which is subjected to a contraction step that causes fibers or groups of fibers to buckle out of the flat plane of a fibrous nonwoven fabric to form the pile-like stratum. The generally vertical fibers of the pile-like stratum are depicted in FIG. 4 and appear as inverted U-shaped loops, of height H and base B. Such loops, when formed from a nonbonded fibrous nonwoven, typically have an average spacing (i.e., base B) in the range of 0.5 to 3 mm, preferably 1 to 2 mm, and a height-to-base ratio of at least 0.5. Loop spacings as small as 0.1 mm and height to base ratios of as large as 15 can be achieved when the layer is highly contracted (e.g., by a factor of 10 to 15) and additional elements capable of forming pile-like fibers are included in the structure (e.g., other non-elastic yarns in the stitching patterns). Practical ways to determine the H and B dimensions of the loops, are described below in the paragraphs on test methods.

A typical nonwoven fibrous layer for use in this embodiment of the process of the invention is a thin, supple, substantially nonbonded web of staple fibers, continuous filaments, plexifilamentary strands or the like. These fibrous materials are referred to collectively herein as "fibers". The fibers are naturally occurring or formed from synthetic organic polymers. Fibers that are smaller than 5 dtex and longer than 5-mm are preferred. Preferred fibrous layers are capable of buckling over a relatively short interval (e.g., 1 mm) and typically weigh in the range of 15 to 100 grams/square meter, preferably less than 60 g/m$^2$. Suitable materials for the starting nonwoven fibrous layer include carded webs, air-laid webs, wet-laid webs, spunlace fabrics, spun-bonded sheets, and the like. Generally, thick lofty webs, felts, adhesively bonded webs or the like are not suitable; such materials usually are difficult to buckle over short intervals.

Contraction and buckling of the fibrous layer can be accomplished in any of several ways. For example, a contractible element, or array of contractible elements, is intermittently attached to the fibrous layer. The spacing between attachment locations is typically at least 1 mm to allow for efficient buckling. Then, the element or array of elements is caused to contract so that the area of the fibrous nonwoven layer is decreased significantly and groups of fibers buckle out of the plane of the layer. Before the contractible elements are attached, additional gathering or contraction can be imparted to the starting fibrous nonwoven layer by over-feeding the layer to the apparatus being employed to attach the contractible elements.

Many types of contractible elements are suitable for use in the present invention. For example, the nonwoven fibrous layer can be stitchbonded with elastic yarns under tension. Textured stretch yarns, covered or bare spandex yarns and the like are suitable yarns for contractible element stitching. After the stitching, the tension can be released to cause the desired contraction and buckling of the fibrous layer. Instead of stitching, extended elastic elements in the form of warps, cross warps, films or the like, can be intermittently attached to the fibrous nonwoven layer by hydraulic entanglement, adhesive or thermal point bonding, or the like. Thereafter, tension on the extended elements can be released to cause the desired contraction and buckling of the layer.

Other types of contractible elements, which shrink on being treated with heat, moisture, chemicals or the like can be attached intermittently to the fibrous layer without initial tension or extension in the elements. After attachment, the contraction of the contractible elements can be activated by appropriate treatment.

Still another way of accomplishing the contraction and buckling of the fibrous nonwoven layer involves intermittently attaching the fibrous nonwoven layer to a stretchable substrate that necks-in in a direction perpendicular to the direction in which the substrate is pulled. For example, certain substrates, when stretched by 15% in one direction, can automatically experience substantially irreversible contraction (i.e., neck in) in a direction perpendicular to the stretch by an amount that is two or three times the percentage stretch. Thus, appropriate intermittent attachment of a fibrous nonwoven layer to the stretchable substrate before the stretching and necking-in operation, and then applying the stretching forces to the combined layer and substrate, can significantly decrease the area of the fibrous nonwoven layer and cause buckling of groups of fibers as required by the process of the invention.

In other embodiments of the process of the invention, the pile-like layer of fibers is derived from conventional yarns in a knit or woven fabric which is constructed with contractible elements. When the contractible elements contract, the area of the fabric decreases significantly and causes the conventional yarns of the fabric to gather and buckle and project from the plane of the fabric. In another embodiment, the pile-like layer includes loops of fibers that project from wrapping yarns that were loosely wrapped around the axis of the contractible core of an elastic combination yarn. Generally, compared to nonwoven fibrous layers, yarns can be buckled and contracted more readily and provide denser pile-like layers. Then, when resin is applied in accordance with the invention, the resultant composite sheets made with buckled yarns possess a higher abrasion resistance than those made with buckled nonwoven fibrous layers.

In still other embodiments of the process, a pile-like layer is derived from a combination of a contracted substantially nonbonded fibrous nonwoven fabric, loose wrapping yarns of a contracted combination yarn and/or a buckled non-elastic yarn. In those embodiments wherein the pile-like layer is formed partially or totally from buckled yarns derived from a knit or woven fabric, the knit or weave is sufficiently coarse to permit the yarns to buckle adequately. Typically, the buckled elements, before buckling have a flat length of at least 1 mm. In still another embodiment, a tufted fabric is contracted to increase the density of the tufted pile fibers for use in a composite sheet of the present invention.

As noted earlier, a combination yarn has a contractible core (e.g., as provided by an elastic or shrinkable yarn) surrounded by a non-contractible conventional "wrapping" yarn or "covering" yarn. The wrapping or covering yarn may be of any natural or synthetic fiber. The wrapping may be combined with the elastic core while the elastic core is under tension by conventional wrapping, winding, plying, covering, air jet entangling or intermingling or the like. The core may be a yarn or monofilament of any elastic or contractible material. Cores of spandex yarn are preferred. If the wrapping yarn is combined loosely (e.g., fewer than 3 turns/inch) with a tensioned and extended elastic core, when the tension is released, the core contracts and the wrapping yarn contracts and buckles perpendicular to the core. Similarly, if the combination yarn has a core of contractible yarn that is combined loosely with a bulkable wrapping, the wrapping will buckle when the contraction of the core occurs. If a fabric is knit, woven or stitchbonded with a combination yarn under tension, when the tension is released from the combination yarn, the yarn contracts and the wrapping yarn buckles contributing pile-like fibers to the surface layer. However, if the wrapping yarn is wound too tightly around the elastic core, the combination yarn cannot provide pile-like fibers to the composite sheet.

In the contraction step of the process of the invention, the area of the fabric from which the vertical fibers are derived is contracted by a factor of at least 2, preferably in the range of 3 to 10, and sometimes by a factor as high as 15. By contracting the fabric by a factor of at least two or higher, the concentration of vertical pile-like fibers in the pile-like stratum of the fabric can be increased significantly. The contraction step is employed before or during application of the resin. The fabric cannot be contracted after the resin has become set.

The fibers are immobilized in place by adding a resin to the stratum, in an amount in the range of 30 to 90% of the total weight of the resin-containing layer (i.e., weight of resin and pile-like fibers), preferably at least 70% of the total weight of the layer. Preferably, the resin is distributed uniformly throughout the entire stratum of pile-like fibers, though a depth of resin (measured from the outer upper surface) of as little as 0.5 mm can be sufficient. As long as the pile-like fibers are immobilized in a substantially vertical position, the distribution can be somewhat non-uniform and there also can be a fairly large void fraction in the layer.

Composite sheets according to the invention also can be produced directly from certain conventional pile fabrics, such as tufted pile fabrics, velvets, moquettes, or the like. However, the pile must have a height and concentration required by the present invention and must be capable of being combined with resin in accordance with the invention. Such conventional starting fabrics have pile-fiber concentrations typically in the range of 0.05 to 0.15 g/cm$^3$. For composite sheets made with such fabrics, the resin typically amounts to at least $\frac{2}{3}$ of the total weight of the pile-like fiber/resin layer. The density of the pile-like fiber/resin layer is generally is at least 0.5 g/cm$^3$, and preferably in the range of 0.7 to 1.0 g/cm$^3$.

Stretchability and compressibility, respectively roughly indicate how much the pile-like fibers can be moved from side to side and how much the pile-like fibers can be crushed when the composite sheet is subjected to abrasion. The abrasion-resistant composite sheet of the invention is resistant to lateral stretch, and to vertical compression and has a stretchability and a compressibility (measured as described hereinafter), which are each no greater than 25%, preferably no greater than 10%. The stretchability and compressibilty of the composite sheet can be controlled in several ways. The stretchability of the composite sheet is affected greatly by the horizontal fibrous network to which the pile-like fibers are attached and from which the pile-pile-like fibers protrude. An inherently non-stretchable fiber network, located within about 3 mm of the outer surface of the composite, can impart non-stretchability to the composite sheet. For low stretchability and low compressibility, a harder, rather than a softer resin is preferred. Lateral stability of the composite sheet in any linear direction also can be achieved by the attachment of strong, substantially non-stretchable strips, films, sheets, webs, cross-warps or the like to the lower (back) surface of the abrasion-resistant layer. The attachment may be by any convenient means, such as gluing, thermal bonding or the like.

Surface effects can be provided to the abrasion-resistant composite sheet, by subjecting the sheet surface to napping, embossing or the like, without severely changing the overall abrasion resistance of the sheet.

Abrasion-resistant composite sheets of the invention are suitable for use in many different articles. The sheets can be molded into various shaped articles, can be used as single or multiple layers, or can be attached by various means to the surface or portions of the surface of various shaped articles to provide the articles with abrasion resistance. For example, composite sheets of the invention are suited for use in shoe uppers, work gloves, automotive engine timing belts, leather-like apparel, indoor athletic protective pads, women's pocketbooks, bags, luggage, saddles, seating surfaces, etc. The more abrasion-resistant composite sheets of the invention are especially suited for articles that are subjected to more demanding abrasion conditions, such as toe, heel and/or sole portions of shoes, bottoms of industrial bags that are often dragged on concrete floors, bearing surface of interacting mechanical parts, soccer balls, heavy duty work boots, gloves, motor-cyclist apparel pads, and the like.

Test Methods

The following methods and procedures are used to measure various characteristics of the composite sheets of the invention.

In composite sheets of the invention, which have vertical pile-like fibers formed by the buckling of a fibrous nonwoven layer or by the buckling of yarn segments over short intervals, inverted U-shaped loops are formed from buckled groups of fibers or from buckled yarns. The height H and the base B of the U-shaped loops of buckled groups of fibers are determined from magnified (e.g., 15–20X) photomicrographs of cross-sections of the loops taken through the loops in a plane perpendicular to the plane of the fibrous layer. The data are then used to calculate an H/B ratio. A low magnification microscope with strong top and/or back lighting on the sample permit direct measurement of the H and B. Usually the average loop height H is equal to the thickness of the contracted fibrous layer. As used herein, "loop spacing" is synonymous with the loop base B, (i.e., the distance between the legs of the inverted "U" that formed the loop of buckled fibers). Alternatively, the average loop height H is sometimes easier to measure directly with a "touch" micrometer having a ¼-inch (0.64-cm) diameter flat cylindrical probe which applies a 10-gram load to the contacted surface. A digital micrometer, model APB-1D, manufactured by Mitutoyo of Japan is suitable for measuring these thicknesses or heights.

In addition to the above-described method, verticality of the pile-like fibers can be determined by examination of a magnified cross-section of the fiber/resin layer. If loops were "crushed" or excessively "pushed down" during resin application, a relatively long flat portion of the inverted U would be seen near the outer surface of the fiber/resin layer. Deflection of straight fibers or tufted yarns from a vertical position also is readily observable.

Stretchability, S, is determined by: (a) cutting a sample measuring 2-cm wide by 10-cm long sample from the layer; (b) marking a standard length, $L_0$, parallel to the long dimension of the sample; (c) suspending a 1.0-kilogram weight from sample for 2 minutes; (d) with the weight still suspended from the sample, re-measuring the "standard length", the re-measured length being designated $L_f$, and (e) determining the stretchability as % S by the formula, % $S=100\ (L_f-L_0)/L_0$.

Compressibility, C, is determined by measuring thickness of the composite sheet under no pressure, $t_0$, and under a pressure of 351 kiloPascals (51 psi), $t_f$, with a thickness gage that imparts a 2.5-pound (1.14-Kg) load onto the composite through a cylindrical foot of ¼-inch (0.64-cm) diameter and then calculating the percent compressibility, % C, by the formula, % $C=100\ (t_0-t_f)/t_0$.

The unit weight of a fabric or fibrous layer is measured according to ASTM Method D 3776-79. The density of the resin-impregnated fabric is determined from its unit weight and its measured thickness. The void fraction of the layer can be readily determined from the measurements of the over-all density of the layer and the weights and densities of the fiber and resin in the layer.

Over-feed ratio, contraction ratio and total gather are parameters reported herein which measures of how much an initial fibrous layer contracts or gathers as a result of the operations to which the layer is subjected. The over-feed ratio, which applies only to the embodiments of the invention which employ a buckled nonwoven fibrous layer, is defined as the ratio of the initial area of a starting fibrous nonwoven layer to the area of the layer immediately up-stream of a first processing step (e.g., a stitchbonding step). Over-feed causes buckling, gathering or compression of the nonwoven layer in the direction in which it is being fed to the operation. The contraction ratio is a measure of the amount of further contraction the nonwoven layer undergoes as a result of the specific operation to which it is subjected (e.g., stitchbonding, release of tension from yarns to which the fibrous layer was intermittently attached). The contraction ratio is defined as the area of the fibrous layer as it enters the specific operation divided by the area of the fibrous layer as it leaves the specific operation. The total gather is defined as the product of the over-feed and contraction ratios. The fraction of original area is the reciprocal of the total gather and is equivalent to the ratio of the final area of the fibrous layer to the initial area of the starting fibrous layer.

To determine the abrasion resistance of samples a Wyzenbeek "Precision Wear Test Meter", manufactured by J. K. Technologies Inc. of Kankakee, Ill., is employed with an 80-grit or a 40-grit emery cloth wrapped around the oscillating drum of the tester. The drum is oscillated back and forth across the face of the sample at 90 cycles per minute under a load of six pounds (2.7 Kg). The test is conducted in accordance with the general procedures of ASTM D 4157-82. The thickness of the sample is measured with the aforementioned thickness gage before and after a given number of abrasion cycles to determine the mm of thickness lost per 1,000 cycles. Note that the thickness abrasion rate with 40-grit paper is typically about 4 to 8 times greater than that abraded with 80-grit paper.

EXAMPLES

The following Examples illustrate the invention with composite sheets in which a stratum of pile-like fibers are provided from a variety of fabrics, including contracted stitchbonded layers of substantially nonbonded fibers (Examples 1–3, Samples 1–6), fabrics comprising contracted yarns combined with a contracted layer of nonbonded fibers (Example 4, Samples 7–9), contracted knit fabrics (Examples 5–6, Samples 10–16), contracted tufted fabrics (Example 7, Samples 17–18), as well as from a variety of not-contracted pile fabrics, including cut velvets (Example 8, Samples 19–21), and velour fabrics (Example 9, Samples 22–23).

Samples of the invention, designated with Arabic numerals, are compared to similar samples, designated with upper case letters, that are outside the invention. The samples of the invention, are shown to be much more abrasion-resistant than samples that are outside the invention. A summary table accompanies each example and records fabrication details, weights, composition, and the abrasion performance of each composite sheet.

Various resins were incorporated in the pile-like fiber stratum of the composite samples of the Examples. Five different resins were employed. The resins are identified in the footnotes to the following listing which tabulates the compressibility, the density and the 40-grit and 80-grit Wyzenbeek abrasion rates of a 100% layer of each resin (i.e., the resin layer containing no fibers).

| Resin* | Wear resistance mm/1,000 cycles | | % Compressibility | Density g/cm³ |
|---|---|---|---|---|
| | 80 grit | 40 grit | | |
| R-1 | 0.20 | 0.90 | 0 | 1.1 |
| R-2 | 0.15 | 0.35 | 0 | 1.0 |
| R-3 | 0.90 | 4.50 | 5 | 1.0 |
| R-4 | 0.04 | 0.15 | 15 | 1.0 |

*Notes:
R-1 is "ZAR" clear polyurethane finish, sold by United Gilsonite Laboratories of Scranton, Pennsylvania
R-2 is ZIP Guard ® 61202 gloss, water based polyurethane wood finish, sold by Star Bronze, of Alliance, Ohio.
R-3 is a two-part formulation, polyurethane resin, sold by K. J. Quinn & Co., Inc. of Seabrook, New Hampshire.
R-4 is natural rubber RSS#1, manufacturing code 220-B40.

Example 1

Figure 5:
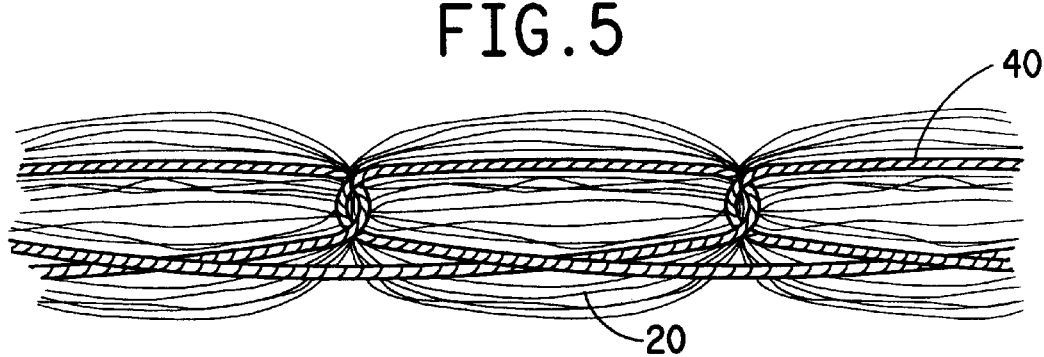
FIG. 5 depicts a stitchbonded fabric in cross-section before a contraction step.
Figure 6:
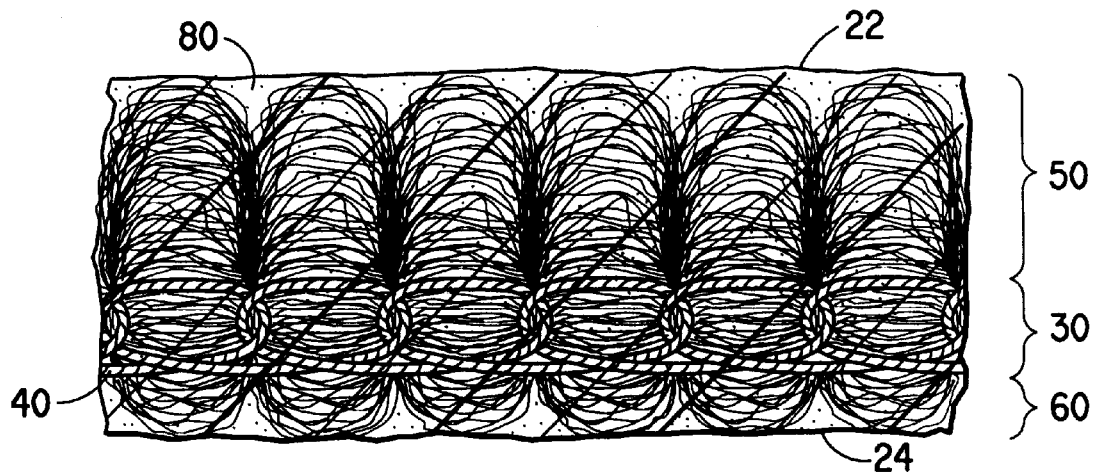
FIG. 6 depicts stitchbonded fabric of FIG. 5 in cross-section after the contraction step and a resin-impregnation step.

This example illustrates the manufacture of composite sheets of the invention, in which a stratum of pile-like fibers is formed by contracting a nonbonded nonwoven fibrous layer, as illustrated in FIGS. 5 and 6. The contraction of the nonwoven is accomplished by over-feeding a nonwoven fibrous layer to a stitchbonding machine, the stitchbonding the layer with elastomeric yarn under tension, releasing the tension on removing the stitched layer from the machine and then heat setting to achieve different amounts of contraction. Samples 1 and 2 of the invention are compared to Samples A, B and C which are outside the invention.

Each of the samples of this example employed a starting fibrous layer of Kevlar® aramid staple fibers of ⅞-inch (2.2-cm) length and 1.5 denier (1.7 dtex). Kevlar® is a fiber is a product sold by E. I. du Pont de Nemours & Co. of Wilmington, Del.

The starting fibrous layer of Samples 1 and 2 of the invention and of comparison Samples A and B each consisted of one or two layers of lightweight Type Z-11 Sontara® spunlaced fabric of Kevlar® aramid staple fiber (sold by E. I. du Pont de Nemours & Co.). The starting fibrous layer was stitchbonded with 280-den (311-dtex) yarn of 70-den (78-dtex) Lycra® spandex covered with textured polyester yarn. A Liba warp-knitting machine was employed with one bar fully threaded at 12 gauge (4.8 needles per cm) and forming 14 courses per inch (5.5 per cm). A 1-0,2-3 repeating stitch pattern was employed. (Conventional warp knitting nomenclature is used herein to describe stitch patterns.) Each sample was then heat set at 380° F. (193° C.) for 2 minutes on a tenter frame with different amounts of longitudinal and transverse stretch.

Comparison Sample C consisted of three superimposed flat layers of Sontara® spunlace fabric Type Z-11, made of Kevlar® aramid staple fibers.

Each of the above-described samples was impregnated with a solution of polyurethane resin. Resin R-1 was applied by dipping the sample into the finish, allowing the excess to drip from the sample (with the loops hanging upside down in a substantially vertical position) and then drying the sample in air for 48 hours at 25° C. and 40% relative humidity. Each sample was then subjected to abrasion testing.

Figure 7:
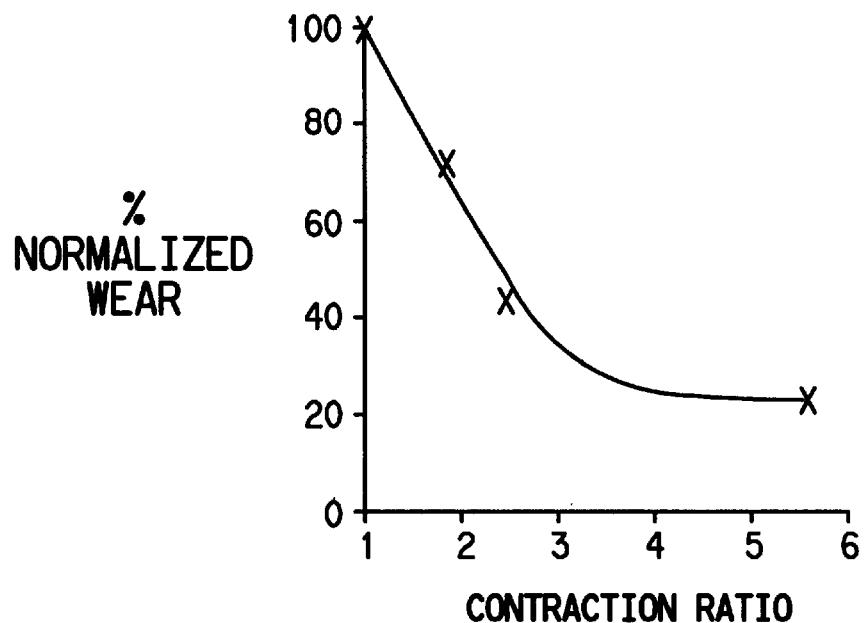
FIGS. 7, 8 and 9 respectively, present graphs of the abrasion resistance of the composite sheets of Examples 1, 2 and 3 as functions of the factor by which the area of the starting fabric contracted during its incorporation into a resin-impregnated composite sheet.

Table I below summarizes the test results along with various characteristics of the dried, resin-impregnated samples. The results of the 80-grit abrasion tests are presented graphically in FIG. 7. Table I and FIG. 7 clearly demonstrate the unexpectedly large advantages in abrasion resistance possessed by Samples 1–2 of the invention over the comparison Samples A, B and C, outside the invention. The data show that when samples were made with a total gather of less than 2.0, the resultant loop H/B ratio was less than 0.5 and/or the fibers were inadequately buckled to reach a substantially vertical position, which in turn resulted in the abrasion resistance of the resin-impregnated composite sheet being very much lower than the abrasion resistance of the fabrics of the invention. Samples 1–2 of the

TABLE I (Example 1)

| Sample Identification | 1 | 2 | A+ | B+ | C+ |
|---|---|---|---|---|---|
| Starting Materials | | | | | |
| Nonwoven wt., g/m² | 82 | 40 | 110 | 41 | 119 |
| Over-feed ratio | 1.3 | 1.3 | 1.0 | 1.4 | 1.0 |
| Contractibles wt., g/m² | 25 | 20 | 20 | 26 | nm |
| Total wt., g/m² | 131 | 72 | 130 | 82 | 119 |
| Gathering | | | | | |
| Contracted wt., g/m² | 262 | 302 | 130 | 113 | 119 |
| Contraction ratio | 2.0 | 4.2 | 1.0 | 1.4 | nm |
| Nonwoven wt., g/m² | 212 | 220 | 110 | 79 | 119 |
| Nonwoven total gather | 2.6 | 5.5 | 1.0 | 1.9 | 1.0 |
| Resin application | | | | | |
| Resin wt., g/m² | 748 | 407 | 872 | 486 | 421 |
| % pile height loss | 0 | 0 | 0 | 0 | 0 |
| Resin-containing stratum | | | | | |
| Total wt., g/m² | 958 | 625 | 980 | 564 | 540 |
| Thickness, mm | 1.5 | 1.2 | 1.2 | 0.9 | 0.8 |
| Density, g/cm³ | 0.64 | 0.52 | 0.82 | 0.63 | 0.68 |

TABLE I-continued (Example 1)

| Sample Identification | 1 | 2 | A+ | B+ | C+ |
|---|---|---|---|---|---|
| Pile fiber weight g/m² | 212 | 212 | 110 | 79 | 119 |
| Pile fiber conc. g/cm³ | 0.13 | 0.17 | 0.08 | 0.08 | 0.14 |
| Loop base, B, mm | 1.9 | 1.4 | 2.8 | 2.3 | nm |
| Loop H/B ratio | 0.8 | 0.9 | 0.4 | 0.4 | nm |
| Wt. % resin | 78 | 65 | 89 | 86 | 78 |
| % voids | 49 | 58 | 35 | 50 | 45 |
| Composite sheet | | | | | |
| % stretchability | 0 | 0 | 0 | 0 | 0 |
| % compressibility | 0 | 10 | 0 | 0 | 5 |
| 80-grit abrasion resistance | | | | | |
| Test duration, 10³ | 7 | 12 | 2.5 | 3 | 6 |
| Wear, microns/10³ cycles | 50 | 25 | 120 | 80 | 120 |
| % normalized wear | 42 | 21 | 100 | 69 | 100 |
| 40-grit abrasion resistance | | | | | |
| Test cycles, 10³ | 1.2 | 2.0 | 0.7 | nm | nm |
| Wear, microns/10³ cycles | 280 | 160 | 700 | 360 | nm |
| % normalized wear* | 40 | 23 | 100 | nm | nm |

Notes:
* Normalized to Sample A;
"nm" = no measurement or not applicable;
+ = no pile-like stratum invention were about 2 to 4 times more resistant to abrasion than comparison samples that had not been contracted.

Note that when a solid layer of "ZAR" polyurethane resin R-1, was abrasion tested without any fiber present in the layer, the layer abraded at rates of 200 and 900 microns per 1000 cycles with 80-grit and 40-grit abraders, respectively, or about 3 to 8 times more rapidly than did the Samples of the invention.

Example 2

Figure 8:
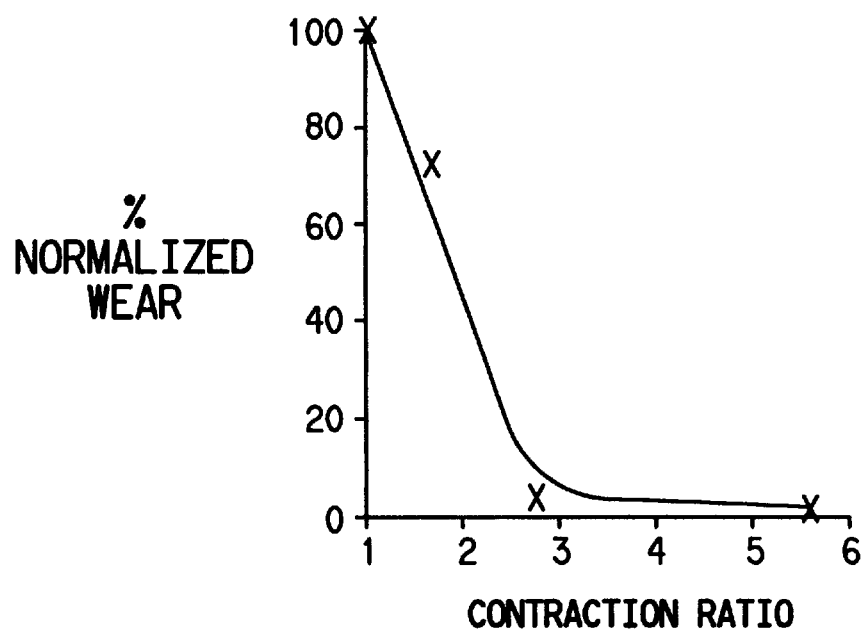

In this example, Samples 3 and 4 illustrate fabrication of composite sheets of the invention from resin-impregnated, contracted nonwoven sheet of substantially nonbonded, flash-spun plexifilamentary film-fibril polyethylene strands and compares their abrasion resistance with similarly prepared comparison Samples D and E which were not subjected to the desired amount of gather or were compressed during the application of resin. Whereas Samples 3 and 4 were subjected to a total gather of 2.7 and 5.7 respectively, comparison Samples D and E, respectively were subjected to no contraction at all (Sample D) or to a total gather of only 1.76 (Sample E). As a result, Samples D and E each lacked a stratum of substantially vertical pile like fibers or loops and each was deficient in abrasion resistance. Samples 3 and 4 of the invention were more than 25 to 100 times as resistant to abrasion as were the comparison samples. Table II, below, summarizes detailed characteristics of the samples. FIG. 8 graphically displays the advantages in 40-grit abrasion resistance of resin-impregnated fabrics of the invention prepared with total gathers of at least 2.0.

In this example, the starting fibrous layer of each sample was a lightweight, non-bonded sheet of flash-spun plexifilamentary film-fibril polyethylene strands which had been treated with hydraulic jets in accordance with the general procedures of Simpson et al, U.S. Pat. No. 5,023,130. The hydraulic jet treatment consisted of supporting the non-bonded sheet on a 24-mesh, 21%-open-area screen, and passing the sheet one time at 10 yds/min (9.1 n/min) under columnar jets of water emerging from a row of 0.005-inch (0.13-mm) diameter orifices, spaced at 40 orifices per inch (15.7/cm) in the row, the row of orifices being positioned about 1 inch (2.5 cm) above the screen and transverse to the direction of movement of the sheet. Water was supplied to the orifices at a pressure of 500 psig (3450 kPa). Such starting fibrous layers are available commercially as Typro® from E. I. du Pont de Nemours and Company. One or two layers of 1.3 oz/yd$^2$ (44 g/m$^2$) commercial Typro® was used for the samples.

TABLE II

Example 2

| Sample Identification | 3 | 4 | D$^+$ | E$^+$ |
|---|---|---|---|---|
| Starting Materials | | | | |
| Nonwoven wt., g/m$^2$ | 96 | 48 | 21 | 57 |
| Over-feed ratio | 1.0 | 1.4 | 1.0 | 1.0 |
| Contractibles wt., g/m$^2$ | 28 | 26 | 0 | 15 |
| Total wt., g/m$^2$ | 124 | 92 | 21 | 72 |
| Gathering | | | | |
| Contracted wt. g/m$^2$ | 334 | 387 | 21 | 126 |
| Contraction ratio | 2.7 | 4.2 | 1.0 | 1.8 |
| Nonwoven wt., g/m$^2$ | 260 | 272 | 21 | 100 |
| Nonwoven total gather | 2.7 | 5.7 | 1.0 | 1.8 |
| Resin application | | | | |
| Resin wt., g/m$^2$ | 741 | 718 | 111 | 88 |
| % pile height loss | 6 | 23 | 66 | 70 |
| Resin-containing stratum | | | | |
| Total wt., g/m$^2$ | 1001 | 990 | 132 | 188 |
| Thickness, mm | 1.3 | 1.1 | 0.18 | 0.23 |
| Density, g/cm$^3$ | 0.76 | 0.92 | 0.73 | 0.83 |
| Pile fiber weight, g/m$^2$ | 260 | 272 | 21 | 100 |
| Pile fiber conc., g/cm$^3$ | 0.20 | 0.25 | 0.24 | 0.36 |
| Loop base, B, mm | 1.4 | 1.3 | nm | 2.6 |
| Loop H/B ratio | 0.9 | 0.8 | nm | 0.09 |
| % resin | 74 | 72 | 85 | 57 |
| % voids | 37 | 23 | 40 | 31 |
| Composite sheet | | | | |
| % stretchability | 5 | 5 | 5 | 10 |
| % compressibility | 5 | 5 | 10 | 10 |
| 80-grit abrasion resistance | | | | |
| Test duration, 10$^3$ | >20 | >20 | 0.12 | 0.03 |
| Wear, microns/10$^3$ cycles | 24 | 6 | 600 | 450 |
| % normalized wear | 4 | 1 | 100 | 75 |
| 40-grit abrasion resistance | | | | |
| Test duration, 10$^3$ cycles | 6.2 | 10 | 0.07 | 0.03 |
| Wear, microns/10$^3$ cycles | 43 | 140 | 2300 | 1800 |
| % normalized wear* | 2 | 6 | 100 | 78 |

Notes:
*Normalized to Sample D;
$^+$= no pile-like stratum

The hydraulic-jet-treated fibrous layers of Typro® sheet of Samples 3, 4 and comparison E were contracted by stitchbonding the layers with elastic yarns that were under tension and then releasing the tension from the yarns. Comparison Sample D, was not stitched or contracted. For Samples 3 and 4 of the invention, the stitching yarn was a 140-den (154-dtex) Lycra® spandex wrapped with 70-den (78-dtex) polyester yarn and one fully threaded 12-gauge bar formed 1-0,1-2 stitches, 14 courses per inch (5.5/cm). For comparison Sample E, the stitching thread was a 70-den (78-dtex) textured nylon yarn and one fully threaded 12-gauge bar formed 1-0, 1-2 stitches, 9 courses per inch (3.5/cm). Each sample was impregnated with a polyurethane resin in the same manner as in Example 1, except that the polyurethane resin employed in this Example, Resin R-3, when dry, was much softer than the polyurethane resin of Example 1. The dry resin of Example 2, had a density of 1.1 g/cm$^3$ and a Shore A durometer hardness of about 53.

Further details of the sample fabrication, characteristics and performance are given in Table II above. Note that when a layer of the softer polyurethane resin used in this example was abrasion tested without any fiber present in the layer, the 100% resin layer abraded at a rates of 900 and 4,500 microns per 1000 cycles with 80-grit and-40 grit abraders, respectively. Samples 3 and 4 of the invention were about 25 to 100 times more abrasion resistant than Comparison Samples D and E. In comparison to the 100% Resin R-3 layer, which contained no fibers at all in the layer, Samples 3 and 4 of the invention were more than 30 to 150 times more abrasion resistant than the 100% resin layer.

Example 3

Figure 9:
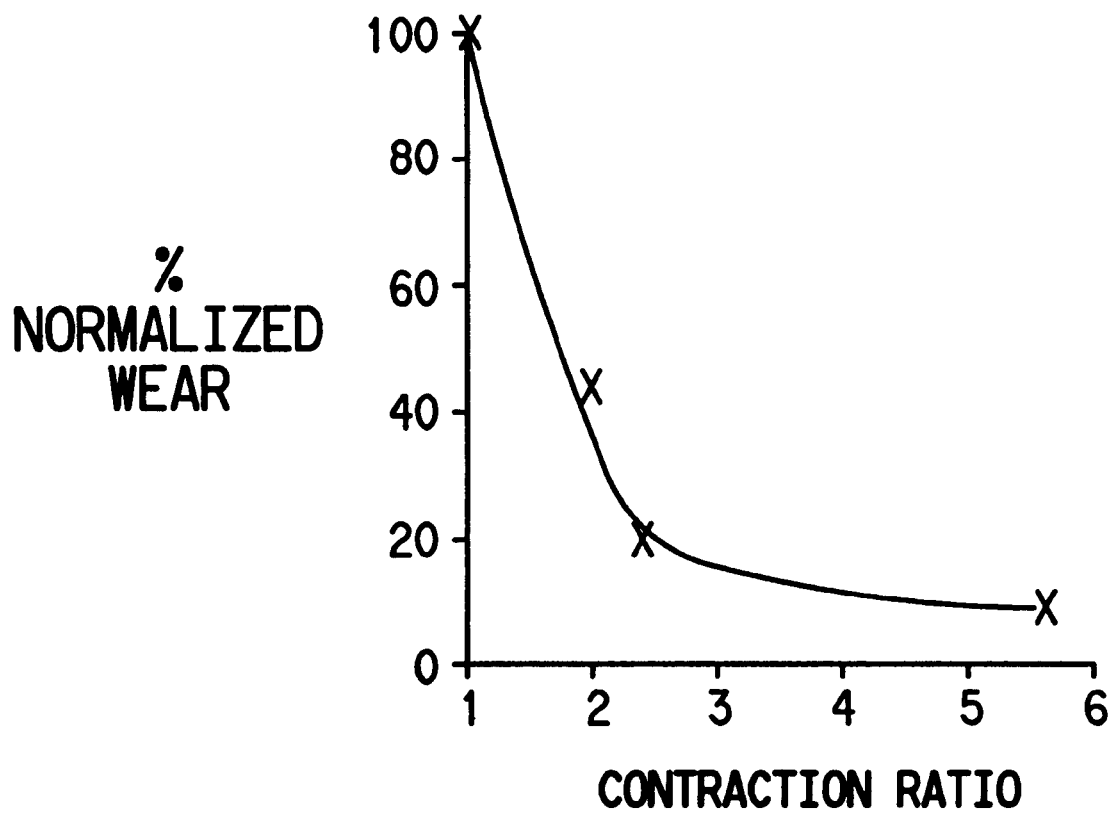

This Example further demonstrates the large improvements in abrasion resistance provided by composite sheets of the invention. In this example, composite sheets were made with the same materials and by the same procedures as were used in Example 1 to make Samples 1, 2, A, B and C, except that natural rubber resin, R-4, was substituted for the polyurethane resin of Example 1. Sample details and abrasion test results are summarized in Table III below and in FIG. 9.

The summarized data show that Samples 5 and 6 of the invention, which were produced with nonwoven fibrous layers that had been contracted to a total gather of 2.6 and 5.5, respectively, were 5 to 10 times as resistant to abrasion as comparison Samples F and G, which were prepared of the same materials but without any contraction of the nonwoven fibrous layer. Also, comparison Sample H, which was prepared of the same materials with a total gather of 1.9, was one half to one fifth as abrasion resistant as Samples 7 and 8. The 80-grit abrasion data are displayed graphically in FIG. 6.

The measured 80-grit wear rate for a layer of 100% of rubber Resin R-4 was 40 microns per 1,000 cycles, or about 6 to 13 times higher than those of Samples 5 and 6 in which layers of the same rubber contained pile-like fibers in accordance with the invention. Note that resin R-4 was inherently 5 to 6 times as abrasion resistant than resin R-1 of Example 1. This shows that the presence of vertical fibers in a resin/fiber layer according to the invention can significantly improve the wear resistance of a wide range of resins.

TABLE III (Example 3)

| Sample Identification | 5 | 6 | F$^+$ | G$^+$ | H$^{++}$ |
|---|---|---|---|---|---|
| Starting Materials | | | | | |
| Nonwoven wt., g/m$^2$ | 81 | 41 | 122 | 108 | 41 |
| Over-feed ratio | 1.13 | 1.31 | 1.0 | 1.0 | 1.36 |
| Contractibles wt., g/m$^2$ | 17 | 19 | 0 | 23 | 25 |
| Total wt., g/m$^2$ | 108 | 73 | 122 | 131 | 81 |
| Gathering | | | | | |
| Contraction ratio | 2.3 | 4.2 | 1.0 | 1.0 | 1.4 |
| Nonwoven total gather | 2.6 | 5.5 | 1.0 | 1.0 | 1.9 |
| Resin application | | | | | |
| Resin wt., g/m$^2$ | 707 | 762 | 428 | 661 | 722 |
| Resin-containing stratum | | | | | |
| Total wt., g/m$^2$ | 917 | 986 | 549 | 769 | 800 |
| Thickness, mm | 1.4 | 1.5 | 0.6 | 1.0 | 1.1 |

TABLE III-continued (Example 3)

| Sample Identification | 5 | 6 | F[+] | G[+] | H[++] |
|---|---|---|---|---|---|
| Density, g/cm$^3$ | 0.66 | 0.62 | 0.91 | 0.78 | 0.72 |
| Pile fiber weight, g/m$^2$ | 210 | 224 | 122 | 108 | 78 |
| Pile fiber conc., g/cm$^3$ | 0.15 | 0.18 | 0.20 | 0.11 | 0.07 |
| Loop base, B, mm | 1.9 | 1.4 | nm | 2.8 | 2.4 |
| Loop H/B ratio | 0.76 | 1.07 | nm | 0.36 | 0.45 |
| % resin | 77 | 77 | 78 | 86 | 91 |
| % voids | 45 | 48 | 24 | 35 | 40 |
| % stretchability | 0 | 0 | 0 | 0 | 0 |
| % compressibility | 5 | 0 | 0 | 5 | 0 |
| Composite sheet 80-grit abrasion resistance | | | | | |
| Test duration, 10$^3$ | 15 | 15 | 4 | 12 | 15 |
| Wear, microns/10$^3$ cycles | 7 | 3 | 33 | 34 | 15 |
| % normalized wear | 21 | 10 | 100 | 100 | 45 |

Notes:
*Normalized to Sample F;
nm = no measurement;
[+] = no pile stratum

Example 4

This example further illustrates the strong effects of total gather and of concentration of pile-like fibers on the abrasion resistance of composite sheets of the invention. Samples 7, 8 and 9, were produced with an abrasion resistant layer in which the pile-like fibers were derived from both a buckled fibrous layer and buckled non-elastic stitching yarns.

TABLE IV

Example 4

| Sample Identification | 7 | 8 | 9 |
|---|---|---|---|
| Starting Materials | | | |
| Nonwoven wt., g/m$^2$ | 26 | 26 | 26 |
| Over-feed ratio | 1.2 | 1.2 | 1.2 |
| Hard yarns wt., g/m$^2$ | 71 | 71 | 71 |
| Contractibles wt., g/m$^2$ | 31 | 31 | 31 |
| Total wt., g/m$^2$ | 133 | 133 | 133 |
| Gathering | | | |
| Contracted wt., g/m$^2$ | 578 | 785 | 238 |
| Contraction ratio | 4.4 | 5.9 | 1.8 |
| Nonwoven wt., g/m$^2$ | 137 | 183 | 56 |
| Hard yarn wt., g/m$^2$ | 312 | 418 | 128 |
| Nonwoven total gather | 5.3 | 7.1 | 2.2 |
| Resin application | | | |
| Resin wt., g/m$^2$ | 1043 | 884 | 479 |
| % pile height loss | 10 | 9 | 8 |
| Resin-containing stratum | | | |
| Total wt., g/m$^2$ | 1489 | 1485 | 683 |
| Thickness, mm | 1.8 | 2.0 | 1.4 |
| Density, g/cm$^3$ | 0.83 | 0.74 | 0.53 |
| Pile fiber weight, g/m$^2$ | 449 | 601 | 184 |
| Pile fiber conc., g/cm$^3$ | 0.25 | 0.30 | 0.16 |
| Loop base, B, mm | 0.44 | 0.30 | 1.00 |
| Loop H/B ratio | 4.1 | 6.6 | 1.4 |
| % resin | 70 | 60 | 73 |
| % voids | 31 | 38 | 56 |
| Composite sheet | | | |
| % stretchability | 5 | 5 | 5 |
| % compressibility | 10 | 5 | 15 |
| 40-grit abrasion resistance | | | |
| Test duration, 10$^3$ cycles | 23 | 31 | 2.3 |
| Wear, microns/10$^3$ cycles | 30 | 10 | 80 |
| % normalized wear* | 38 | 13 | 100 |

Note:
*Normalized to Sample 11.

The starting fibrous nonwoven layer for each sample was a 26-g/m$^2$ Sontara® 8017 spunlace fabric of nonbonded polyester fibers. The spunlace fabric was overfed 20% to a two-bar, "Liba" stitchbonding machine. The front bar formed a repeating pattern of 1-0,2-3 stitches with combination yarn that had 280-den (311-dtex) Lycra® spandex elastic core, wound 9 turns/inch (3.5/cm) with 70-den (78-dtex) 34-filament polyester yarn. The back bar formed a repeating pattern of 3-4, 1-0 stitches with a 210 den (233 dtex) 34-filament high tenacity Type 62 Dacron® polyester yarn. Lycra® and Dacron® are each sold by DuPont. The stitchbonding machine was a 14-gauge machine that inserted 14 courses per inch (5.5/cm). Different amounts of tension were imposed on the combination yarn used to prepare each sample. Then, upon removal of the fabric from the stitchbonding machine, the tension was released causing combination yarn to contract, which in turn caused contraction and buckling of the nonwoven layer and buckling of the back-bar non-elastic stitching yarns. As a result, a stratum of pile-like fibers was formed. The fibers were immobilized with the same hard polyurethane resin as was used in Example 1. Further fabrication and abrasion performance details of the Samples are summarized in Table 4 above.

Example 5

This example illustrates the invention with composite sheet samples prepared from contracted fabric that was single-bar knit with an elastic combination yarn having a loosely wound non-elastic wrapping. The pile-like fibers are derived from the wrapping of the contracted combination yarn.

Samples 10–13 and Comparison Sample I were each knit with one bar of a "Liba" machine forming a repeating pattern of 1-0,2-3 stitches with a combination yarn that consisted of a 280-den (311-dtex) Lycra® spandex elastic core, around which was loosely wound, at about 1.5 turns/inch (0.6/cm), a 70-den (78-dtex) 34-filament textured polyester yarn. Each sample was made with the Liba operating at 14 courses/inch (5.5/cm) and 20 gage (except Sample 13 which was made at 10 gage). In knitting the fabric, the combination yarn was under a pre-set tension. Upon removal of the fabric from the knitting machine, the as-knit area of the fabric contracted by a factor 11.5 to 14 times, with an accompanying contraction and buckling of the loosely wound wrapping yarn to form the pile-like layer. The same soft polyurethane resin, R-3, as was used in Example 2 was applied to the pile-like fibers of each sample, except Sample 12 to which water base polyurethane resin R-2 was applied. Further details of sample fabrication and abrasion performance are summarized in Table V below.

The abrasion test results listed in Table V illustrate the high pile densities and high abrasion resistances that can be achieved with fabrics having buckled yarns. The results also demonstrate the importance of avoiding excessive stretchability in the composite sheet. Note that the pile-like fiber/resin surface layer of Comparison Sample I, with a resin content of only 23 weight %, was readily stretchable and exhibited an abrasion rate that was about 1 1 to 18 times faster than the abrasion rates of Samples 10–13 of the invention. Unless the amount of resin incorporated in the fiber/resin surface layer is in accordance with the invention, even if other characteristics of the layer are in accordance with the invention, the composite sheet will still lack resistance to stretching and abrasion.

TABLE V (Example 5)

| Sample Identification | 10 | 11 | 12 | 13 | I |
|---|---|---|---|---|---|
| Starting Materials | | | | | |
| Wrapping yarn wt., g/m² | 24 | 24 | 24 | 21 | 24 |
| Contractibles wt., g/m² | 22 | 22 | 22 | 20 | 22 |
| Total wt., g/m² | 46 | 46 | 46 | 41 | 46 |
| Gathering | | | | | |
| Contracted wt. g/m² | 557 | 557 | 557 | 476 | 557 |
| Contraction ratio | 11.5 | 11.5 | 11.5 | 14.0 | 11.5 |
| Wrapping yarn wt., g/m² | 276 | 276 | 276 | 294 | 276 |
| Resin application | | | | | |
| Resin wt., g/m² | 901 | 1003 | 1003 | 1023 | 85 |
| % surface height loss | 17 | 17 | 17 | 13 | 17 |
| Resin-containing stratum | | | | | |
| Total wt., g/m² | 1186 | 1285 | 1292 | 1281 | 85 |
| Thickness, mm | 1.5 | 1.5 | 1.5 | 1.4 | 1.5 |
| Density, g/cm³ | 0.79 | 0.86 | 0.86 | 0.91 | 0.23 |
| Pile fiber weight, g/m² | 276 | 276 | 276 | 294 | 276 |
| Pile fiber conc., g/cm³ | 0.2 | 0.2 | 0.2 | 0.15 | 0.2 |
| Loop base, B, mm | 0.12 | 0.12 | 0.12 | 0.10 | 0.12 |
| Loop H/B ratio | 12.5 | 12.5 | 12.5 | 14.0 | 12.5 |
| % resin | 76 | 78 | 78 | 80 | 23 |
| % voids | 35 | 32 | 32 | 24 | 81 |
| Composite sheet | | | | | |
| % stretchability | 10 | 5 | 0 | 5 | 80 |
| % compressibility | 5 | 5 | 5 | 5 | 25 |
| 40-grit abrasion resistance | | | | | |
| Test duration, 10³ cycles | >20 | 18 | >25 | 23 | 0.8 |
| Wear, microns/10³ cycles | 30 | 40 | 25 | 40 | 450 |
| % normalized wear* | 6.7 | 8.9 | 5.6 | 8.9 | 100 |

Notes:
*Normalized to Sample I.

The abrasion resistance of a 100% layer (i.e., no fiber in the layer) of the soft polyurethane resin R-3 used for Sample 10, 1 1 and 13, compared to that of a layer of 100% Resin R-2 used for Sample 12 showed that the 100% R-3 resin layer abraded about 13 times faster in a 40-grit abrasion test than did the R-2 layer. However, the abrasion-resistance data listed in Table V, clearly demonstrate that the presence of pile-like fibers in the layer is surprisingly much more effective in providing greater abrasion resistance to the composite sheet than simply using a more wear-resistant resin in the surface layer.

Example 6

This example illustrates the invention of composite sheet which were prepared from contracted two-bar knit fabrics. The fabric for each sample, except Sample J, was knit with one bar threaded with an elastic combination yarn having a loosely wound non-elastic wrapping and the second bar threaded with non-elastic textile yarn; the elastic yarn of Sample J had no wrapping yarn. Upon removal from the knitting machines, contraction of the fabric for samples of the invention (Samples 14–16) resulted in a stratum of substantially vertical pile-like fibers being formed. The pile-like fibers were derived from both the contracted wrapping yarn and from the buckled second bar yarn. As explained below, the fabric of comparison Sample J did not provide a satisfactory pile-like stratum and accordingly exhibited much inferior abrasion resistance.

Samples 14, 15 and 16 were each knit on a two-bar "Liba" machine. The front bar formed repeating patterns of 1-0,2-3 stitches with a 280-den (311-dtex) Lycra® spandex around which was loosely wound, at one turn/inch (0.4/cm), a 70-den (78-dtex) 34-filament textured polyester yarn (the same style of elastic yarn as was used in Example 5). The back bar formed a repeating pattern of 3-4,1-0 stitches with a 150-denier (167-dtex) conventional textile polyester yarn. Each sample was made with the machine operating at 14 courses/inch (5.5/cm), except that Sample 15 was made with 22 courses per inch (8.7/cm) and with the machine threaded at 20 gage and Sample 16 was threaded at 10 gage. Tension on the combination yarn used to prepare the samples was adjusted so that when the knit fabric was removed from the machine, the as-knit area of the fabric contracted by a factor of 3.6 to 7. The contraction of the fabric was accompanied by contraction and buckling of the loosely wound wrapping yarn and buckling of the second bar yarn. Polyurethane resin R-3 (same as in Example 2) was applied to each sample, except Sample 14, to which harder polyurethane resin R-2 was applied.

Comparison Sample J was prepared from a commercial swim-suit knit fabric, which consisted of 15 weight % Lycra® yarns and 85 weight % nylon yarns. The fabric was knit with a 1-0, 1-2/1-2, 1-0 stitch pattern at 40 gauge and 40 courses per inch (15.7/cm). The longest as-knit intervals between stitches or courses, which were the underlap segments of nylon yarn, were about 0.8 mm. This segment length was too short to permit adequate buckling of the yarn when the fabric was contracted. Contraction of the fabric area by a factor of 3.6 resulted in an increase in fabric thickness of only about 14% (from 0.35 mm to about 0.4 mm), indicating that a vertical reorientation of the yarn did not occur. The lack of verticality of the fibers was confirmed by inspection of a cross-section of the sample.

TABLE VI

Example 6

| Sample Identification | 14 | 15 | 16 | J |
|---|---|---|---|---|
| Starting Materials | | | | |
| Hard yarn wt., g/m² | 65 | 92 | 32 | 38 |
| Wrapping yarn wt.,g/m² | 24 | 33 | 23 | 0 |
| Contractibles wt., g/m² | 22 | 28 | 22 | 7 |
| Total wt., g/m² | 111 | 153 | 77 | 45 |
| Gathering | | | | |
| Contracted wt., g/m² | 537 | 554 | 540 | 160 |
| Contraction ratio | 4.8 | 3.6 | 7.0 | 3.6 |
| Hard yarn wt., g/m² | 312 | 331 | 224 | 137 |
| Wrapping yarn wt., g/m² | 115 | 101 | 161 | 0 |
| Resin application | | | | |
| Resin wt., g/m² | 646 | 721 | 935 | 224 |
| % surface height loss | 15 | 16 | 4 | 0 |

TABLE VI-continued

Example 6

| Sample Identification | 14 | 15 | 16 | J |
|---|---|---|---|---|
| Resin-containing stratum | | | | |
| Total wt., g/m² | 1183 | 1275 | 1483 | 361 |
| Thickness, mm | 2.0 | 1.6 | 2.4 | 0.4 |
| Density, g/cm³ | 0.54 | 0.72 | 0.56 | 0.90 |
| Pile fiber weight, g/m² | 427 | 432 | 385 | 137 |
| Pile fiber conc., g/cm³ | 0.22 | 0.27 | 0.18 | 0.34 |
| Loop base, B, mm | 0.3 | 0.3 | 0.27 | 0.3 |
| Loop H/B ratio | 6.7 | 5.3 | 8.9 | <0.5 |
| % resin | 64 | 66 | 73 | 62 |
| % voids | 55 | 40 | 53 | 25 |
| Composite sheet | | | | |
| % stretchability | 0 | 10 | 5 | 5 |
| % compressibility | 15 | 10 | 5 | 0 |
| 40-grit abrasion resistance | | | | |
| Test duration, 10³ cycles | >25 | >25 | >25 | 0.7 |
| Wear, microns/10³ cycles | 25 | 28 | 40 | 590 |
| % normalized wear* | 4 | 5 | 7 | 100 |

Notes:
*Normalized to Sample J;
+no pile-fiber stratum.

The abrasion performance details of the samples, summarized in Table VI above, show that Comparison Sample J exhibited between 14 to 25 times as much abrasion wear as did Samples 14–16 of the invention. Sample J lacked of a layer of substantially vertical pile-like fibers.

Example 7

This example illustrates the invention with the resin-impregnated tufted fabrics. Samples 17 and 18 were prepared from tufted fabrics to which polyurethane resin R-3 was applied and then cured for 4 hours at 200° F. (93° C.) under no pressure. In applying resin to the samples, care was take to avoid excessive crushing or deflecting of the tufts from their vertical position. In each of the samples the resin extended only partially into the pile-fiber stratum. Table VII below summarizes other details of fabrication and abrasion testing of the samples.

The starting fabric for Sample 17 was a tufted, stitchbonded elastic fabric. The stitchbonded fabric was prepared by forming 1-0,0-1 chain stitches with an elastic combination yarn having a 280-den (311-dtex) Lycra® core wrapped with a 70-den (77-dtex) 34-filament textured polyester yarn, in a 1.2-oz/yd² (40.7 g/m²) Sontara® Style 8000 spunlaced nonwoven fibrous substrate of polyester fibers. The elastic yarn stitch frequency was 12/inch (4.7/cm) and 12 gage. The thusly prepared stitchbonded elastic fabric was then tufted at 10 gage and 10 tufts/in (3.9/cm) with a 1600-den (1,778-dtex) bulked nylon carpet yarn.

Before polyurethane resin R-3 was applied to the tufted stitchbonded fabric of Sample 17, the sample was released from the tension of the tufting machine and steam was passed through the back of the fabric. As a result of the steam treatment, the fabric experienced a 2.6-fold decrease in length and an accompanying increase from 0.05 to 0.13 g/cm³ in tuft concentration (i.e., pile fiber concentration).

To produce composite Sample 18, a 1.5-oz/yd² (50.9 g/m²) Reemay® spunbonded nonwoven sheet of substantially nonbonded polyester filaments was tufted with the same yarn and tuft frequency as was Sample 17. The tufted fabric of Sample 18 was stretched longitudinally to cause a transverse necking in to one-third its original width. Upon release of the tension, the fabric relaxed so that the original tuft gage and tuft frequency per inch (per 2.54 cm) changed respectively from 10 and 10 to 29 and 7. These dimensional changes in Sample 18 were accompanied by a change in tuft (i.e., pile) concentration from 0.05 to 0.10 g/cm³.

Samples 17 and 18 each measured about 4.4 mm in total thickness and had a tuft (i.e., pile) height above the planar tufted substrate of about 2.6 mm. . Resin R-3 was applied to the tufts to a depth of about 1.3 mm from the outer surface (i.e., covering about half the pile height. The resin immobilized the tufts of Samples 17 and 18 in a vertical position. Table VII summarizes characteristics and abrasive wear performance of Samples 17 and 18. Note that each sample was very abrasion resistant, exhibiting a 40-grit abrasive wear of less than 50 microns per 1,000 cycles.

TABLE VII

Example 7

| Sample Identification | 17 | 18 |
|---|---|---|
| Starting Materials | | |
| Tuft wt., g/m² | 150 | 150 |
| Substrate wt., g/m² | 85 | 136 |
| Total wt., g/m² | 235 | 286 |
| Gathering | | |
| Contracted wt. g/m² | 611 | 572 |
| Contraction ratio | 2.6 | 2.0 |
| Tuft wt., g/m² | 390 | 300 |
| Substrate wt., g/m² | 221 | 272 |
| Resin application | | |
| Resin wt., g/m² | 447 | 435 |
| % surface height loss | 12 | 17 |
| Resin-containing stratum | | |
| Total wt., g/m² | 837 | 735 |
| Thickness, mm | 1.4 | 1.3 |
| Density, g/cm³ | 0.62 | 0.56 |
| Pile fiber weight, g/m² | 390 | 300 |
| Pile fiber conc., g/cm³ | 0.13 | 0.10 |
| % resin | 69 | 74 |
| % voids | 48 | 53 |
| Composite sheet | | |
| % stretchability | 15 | 10 |
| % compressibility | 15 | 15 |
| 40-grit abrasion resistance | | |
| Test duration, 10³ cycles | >25 | >25 |
| Wear, microns/10³ cycles | 45 | 48 |

Example 8

This example further illustrates the invention with abrasion-resistant composite sheets prepared with relatively high resin concentrations (e.g., >80%) in the upper part of the pile stratum of commercial cut-velvet woven upholstery fabrics having low pile fiber concentrations (e.g., 0.05 to 0.10 g/cm³). Four composite sheet samples were prepared; Samples 19, 20 and 21 of the invention and comparison Sample K. Polyurethane resin R-3 was applied to the pile of each cut-velvet fabric and then cured as in Example 7. As indicated in Table VIII below, the resin impregnated the thickness of the pile stratum to different, less-than-total pile depths.

The starting fabric for Samples 19 and 20 weighed 16.3 oz/yd² (553 g/m²) measured 2.3 mm in total thickness. By shaving off the pile layer from the fabric, the woven base of the fabric, the remaining loop bottoms and a small amount of adhesive that had been used in the fabric, was found to weigh 12 oz/yd² (407 g/m²). The pile weighed 4.3 oz/yd² (146 g/m²). The original pile height was 1.8 mm and the pile concentration was 0.08 g/cm³. The pile "tuft" frequency in both the length and width directions of the fabric was 20 per inch (7.9/cm). The starting fabric for Sample 21 weighed 15.3 oz/yd² (519 g/m²), had a total thickness of 2.2 mm, a woven base weight of 12.9 oz/yd² (437 g/m²) and a base thickness of 0.8 mm. The pile weighed 2.4 oz/yd² (81 g/m²). The original pile height was 1.4 mm and the pile concentration was 0.06 g/cm³. Table VIII below summarizes other fabrication details and the abrasion performance of the samples.

TABLE VIII

Example 8

| Sample Identification | 19 | 20 | K | 21 |
|---|---|---|---|---|
| Starting Materials | | | | |
| Pile wt., g/m² | 143 | 143 | 143 | 439 |
| Substrate wt., g/m² | 411 | 411 | 411 | 439 |
| Total wt., g/m² | 554 | 554 | 554 | 521 |
| Resin application | | | | |
| Resin wt., g/m² | 1047 | 649 | 350 | 398 |
| % surface height loss | 0 | 0 | 0 | 0 |
| Resin-containing stratum | | | | |
| Total wt., g/m² | 1190 | 792 | 493 | 480 |
| Thickness, mm | 1.3 | 1.2 | 1.5 | 0.9 |
| Density, g/cm³ | 0.94 | 0.74 | 0.31 | 0.59 |
| Pile fiber weight., g/m² | 143 | 143 | 143 | 82 |
| Pile fiber conc., g/cm³ | 0.08 | 0.08 | 0.08 | 0.06 |
| % resin | 91 | 87 | 75 | 88 |
| % voids | 22 | 38 | 74 | 51 |
| Composite sheet | | | | |
| % stretchability | 0 | 0 | 0 | 0 |
| % compressibility | 5 | 10 | 30 | 10 |
| 40-grit abrasion resistance | | | | |
| Test duration, 10³ cycles | 25 | >25 | 7 | 12 |
| Wear, microns/10³ cycles | 60 | 30 | 300 | 80 |
| % normalized wear | 20 | 10 | 100 | 27 |

Notes:
*Normalized to Sample K;
+= Pile fibers not vertical;

The fiber/resin layers of Samples 19 and 20, respectively comprised 91 and 87 weight % resin. These samples of the invention performed well in abrasion tests, each exhibiting a 40-grit abrasive wear of less than 60 microns per 1,000 cycles. Comparison Sample K, which was prepared the same way as Samples 19 and 20, but with only 75 weight % resin was too compressible (30%) and abraded 5 to 10 times more rapidly than Samples 19 and 20. Sample 21, which had a pile fiber concentration of only 0.06 g/cm³, but a resin concentration in the pile layer of 88%, also exhibited excellent wear performance, only 27 microns per 1,000 cycles in the 40-grit abrasion wear test.

Example 9

In this example, two composite sheet samples were prepared with resin-impregnated velour fabrics providing the pile-like fiber stratum for the resin/fiber layers.

The velour fabrics for Sample 22 and 23 were prepared on a 130-inch (3.3-meter) wide, 70 gauge (70 needles/inch or 27.6/cm), three-bar warp-knitting machine which formed 64 courses per inch (25.2/cm). A type KS3P machine, manufactured by Karl Mayer of Frankfurt, Germany, was used. The first bar was threaded with a flat (i.e., not textured) 70-den (77-dtex), 24-filament polyester yarn and formed a repeating pattern of 1-0,1-1,2-1 stitches. The second bar was threaded with a flat, 100-den (110-dtex) 40-filament polyester yarn and formed a repeating pattern of 1-0,0-0,1-1 stitches. The third bar was threaded with a flat 70-den (77-dtex), 24-filament polyester yarn and formed a repeating pattern of 1-0,0-0,1-1 stitches. The velour fabric that was formed by the machine had a knit backing (i.e., base) layer that weighed 347 g/m² and layer of looped yarns that measured 1.5 mm high, weighed 231 g/m², had a effective pile fiber concentration of 0.18 g/cm³.

Sample 22, in the as-knitted condition, was impregnated with polyurethane resin R-3. Sample 23, in the as-knit condition, was heat set at a temperature of 375° F. (191° C.) to stabilize the fabric dimensions. Then the loops of the heat-set Sample 23 were sheared to provide a pile height of 1.2 mm. Sample 23 also was impregnated with polyurethane resin R-3.

As shown in Table IX, Samples 22 and 23 were composite sheets of the invention that performed quite well in the 40-grit abrasion wear test, exhibiting a wear rate of only about 40 microns per 1,000 cycles.

TABLE IX

Example 9

| Sample Identification | 22 | 23 |
|---|---|---|
| Starting Materials | | |
| Base layer weight, g/m² | 347 | 347 |
| Pile weight, g/m² | 231 | 231 |
| Pile height, mm | 1.5 | 1.5 |
| After heat setting & shearing⁺ | | |
| Base layer weight, g/m² | 347 | 347 |
| Pile weight, g/m² | 231 | 210 |
| Pile height, mm | 1.5 | 1.4 |
| Resin application | | |
| Resin weight, g/m² | 452 | 422 |
| % pile height loss | 15 | 15 |
| Resin-containing stratum | | |
| Total weight, g/m² | 683 | 682 |
| Thickness, mm | 1.3 | 1.2 |
| Density, g/cm³ | 0.53 | 0.53 |
| Pile fiber weight, g/m² | 231 | 210 |
| Pile fiber conc., g/cm³ | 0.18 | 0.18 |
| Base, B, mm | 0.4 | 0.4 |
| H/B ratio | 3.3 | 3.0 |
| Wt. % resin | 66 | 67 |
| % voids | 45 | 44 |
| Composite sheet | | |
| % stretchability | 10 | 0 |
| % compressibility | 15 | 15 |
| 40-grit abrasion resistance | | |
| Test duration, 10³ cycles | 16 | 15 |
| Wear, microns/10³ cycles | 41 | 38 |

Notes:
⁺Only Sample 23 was sheared.

I claim:
1. An abrasion-resistant composite sheet comprising
an upper outer surface,
a lower surface,
a planar fibrous network of yarns located between and substantially parallel to the upper and lower surfaces,
a stratum comprising pile-like fibers that loop through the planar fibrous network, protrude generally perpendicularly from the planar fibrous network and extend to the upper outer surface of the composite sheet, the stratum of pile-like fibers having a height in the range of 0.5 to 3.0 millimeters and a concentration of vertical pile-like fibers in the range of 0.05 to 0.5 g/cm$^3$ and a resin extending through the stratum of pile-like fibers from the upper outer surface to a depth of at least 0.5 mm, the resin immobilizing being an elastomer and the pile-like fibers in a position generally vertical to the planar fibrous network, and the resin-containing depth of the pile-like stratum having a density of at least 0.5 gram/cm$^3$, the resin-containing stratum of immobilized pile-like fibers exhibiting a 40-grit Wyzenbeek abrasion wear that is at least three times the 40-grit Wyzenbeek abrasion wear of a layer of the resin containing no fibers the composite sheet having a stretchability of no greater than 25%, a compressibility of no more than 25%, and a total unit weight in the range of 150 to 3,000 grams/m$^2$.

2. A composite sheet of claim 1 wherein the resin is a polyurethane elastomer and amounts to at least 50% of the total weight of the surface layer, the concentration of the vertical pile-like fibers is in the range of 0.15 to 0.35 g/cm$^3$, the density of the resin-containing depth of the pile-like stratum is in the range of 0.7 to 1.0 g/cm$^3$, the height of the stratum of pile-like fibers is in the range of 1 to 3 mm and the resin extending throughout the entire pile-like stratum, the composite sheet exhibiting a 40-grit Wyzenbeek abrasion wear of no more than 50 microns per 1,000 cycles.

3. A composite sheet of claim 1 or 2 wherein the stretchability and compressibility are each no greater than 10%.

4. A composite sheet of claim 1 or 2 wherein the vertical pile-like fibers are inverted U-shaped loops formed from a contracted fabric, the loops having an average spacing in the range of 0.1 to 2 mm and an average height-to-base ratio of at least 0.5.

5. A composite sheet of claim 4 wherein the contracted fabric is a knit fabric comprising a combination yarn having a contractible core and a loosely wrapped hard yarn wrapping.

6. A composite sheet of claim 4 wherein the contracted fabric is a two-bar knit fabric, one bar being the combination yarn and the second bar being a hard yarn.

7. A composite sheet of claim 4 wherein the contracted fabric comprises a contracted nonwoven layer of substantially nonbonded fibers.

8. A composite sheet of claim 7 wherein the contracted fabric further comprises a stitchbonding yarn that is a combination yarn having a contractible core and a loosely wrapped hard yarn wrapping.

9. A composite sheet of claim 4 wherein the contracted fabric is a two-bar stitchbonded fibrous layer, wherein the stitchbonding yarn of one bar is a combination yarn having a contractible core and a loosely wrapped hard yarn wrapping and the stitchbonding yarn of the second bar is a hard yarn.

10. A composite sheet of claim 1 or 2 wherein the composite sheet comprises a resin-impregnated tufted pile fabric or a resin-impregnated velour fabric.

11. A shaped article having attached to at least a portion of a surface thereof, an abrasion-resistant composite in accordance with claim 1.

12. An abrasion -resistant composite sheet of claim 1 wherein the resin-containing stratum of immobilized fibers contains many small voids amounting to at least 10 percent to the total volume of the stratum.

13. An abrasion -resistant composite sheet of claim 1 wherein the voids amount to 25 to 40 percent of the total volume of the stratum.

* * * * *